United States Patent Office 2,927,843
Patented Mar. 8, 1960

2,927,843

PURIFICATION OF TITANIUM TETRACHLORIDE

Howard M. Dess, Grand Island, N.Y., assignor to Union Carbide Corporation, a corporation of New York No Drawing. Application February 20, 1956
Serial No. 566,369

18 Claims. (Cl. 23—87)

This invention relates to a method for the purification of titanium tetrachloride, and more particularly to the removal therefrom of hexachlorosiloxane impurities.

Hexachlorosiloxane is found to be a commonly present impurity in technical grade titanium tetrachloride. In many instances, however, a very high degree of purity is necessarily required of this compound. For example, titanium tetrachloride is a useful intermediate in the production of titanium metal. The presence of hexachlorosiloxane in titanium tetrachloride in quantities of less than 1 percent may result in the material alteration of one or more physical properties of the titanium metal produced therefrom. Even as little as 0.5 percent hexachlorosiloxane in titanium tetrachloride transfers up to 0.35 percent silicon and 0.1 percent oxygen to the titanium metal, which would thereby become hardened and embrittled.

It is evidently desirable, therefore, that hexachlorosiloxane impurities be removed from titanium tetrachloride which is to be used in the production of titanium metal or whenever a high degree of purity for titanium tetrachloride is found to be desirable. This impurity is, however, extremely difficult to separate by the usual method of rectification, since the respective boiling points of titanium tetrachloride and hexachlorosiloxane differ by less than 0.5° C. The present method of accomplishing this separation is by pyrolysis at temperatures of approximately 1000° C. At this temperature, hexachlorosiloxane decomposes to silicon dioxide and silicon tetrachloride which may then be removed. This method requires the utilization of equipment capable of producing or withstanding high temperatures and the pressures resulting therefrom and represents a costly, extensive and inconvenient operation. Furthermore, the removal of one of the decomposition products, silicon tetrachloride, from the titanium tetrachloride by fractional distillation is still necessary if this method is employed.

It is an object of this invention to provide an improved method for the separation of hexachlorosiloxane from titanium tetrachloride.

The object of this invention is achieved by the fluorination of hexachlorosiloxane impurities to yield fluorochloride derivatives of the type $Si_2OF_xCl_{6-x}$ wherein $x$ is an integer from 1 to 6. The products thus formed have boiling points considerably lower than the parent compound, and are then readily separated from the titanium tetrachloride by methods utilizing boiling point differences as a basis for said separation.

In a preferred embodiment of the invention, a fluorinating agent is added to the titanium tetrachloride mixture. Of the fluorinating agents finding application in the conversion of hexachlorosiloxane into its fluoride derivatives, alkali metal bifluorides, such as potassium bifluoride, $KHF_2$, are preferably utilized. Many other fluorine-containing compounds capable of producing this effect, such as bromine trifluoride and titanium tetrafluoride, may also be used.

The fluorinating agent is added to the impure titanium tetrachloride in an amount sufficient to quantitatively convert all the hexachlorosiloxane impurity to a lower boiling fluoro-derivative. Preferably, a quantity in excess of the stoichiometric amount necessary to convert all of the hexachlorosiloxane to hexafluorosiloxane is added. A maximum difference in boiling points between titanium tetrachloride and that of the siloxane halide impurity, as indicated in the table below, would thereby result, effecting a more efficient and readily obtainable separation.

TABLE I

| Compound: | Boiling point (° C.) |
|---|---|
| $TiCl_4$ | 136.4 |
| $Si_2OCl_6$ | 136.0 |
| $SiCl_4$ | 57.6 |
| $Si_2OF_3Cl_3$ | 42.9 |
| $Si_2OF_4Cl_2$ | 16.8 |
| $Si_2OF_6$ | −23.3 |

The fluorinating process is advantageously effected by refluxing the mixture of impure titanium tetrachloride and fluorinating agent at a temperature approximating the boiling point of titanium tetrachloride. Refluxing may be performed separately or as part of subsequent separation techniques.

The mixture is then subjected to methods of separation wherein boiling point differences are utilized as a basis for this separation. Preferably the mixture is fractionally distilled, during which process the lower boiling fluoro-derivatives of hexachlorosiloxane are drawn off. Other similar methods of separation, however, may also be used.

This invention will be illustrated in greater detail by description in connection with the following specific examples of its practice, but is not to be necessarily so limited.

*Example I*

A mixture of 1 kilogram of technical grade titanium tetrachloride and 15.9 grams of hexachlorosiloxane was placed into a suitable distilling flask. To this mixture, 30 grams of potassium bifluoride was added. The mixture was allowed to reflux gently for 24 hours after which time it was distilled through a vacuum-jacketed column with Pyrex helices. Three fractions were taken. The first fraction consisted of all the material that boiled at temperatures below the final constant boiling range (133°–134° C.). The second and third fractions were both middle fractions boiling in the 133°–134° C. range. Infra red spectra of samples from the last two fractions indicated that all the hexachlorosiloxane had been removed.

A mixture of 1 kilogram of technical grade titanium tetrachloride and 12.8 grams of hexachlorosiloxane was placed in a suitable distilling flask. The solution was distilled in the absence of a fluorinating agent. Infra red analysis showed the presence of hexachlorosiloxane in the distillate.

*Example II*

A mixture of 3 kilograms of titanium tetrachloride and 5.8 grams of hexachlorosiloxane was placed into a suitable distilling flask. To this mixture, approximately 8 grams of titanium tetrafluoride were added. The mixture was refluxed for 40 hours and then fractionated. Infra red analysis of the distillate substantiated the quantitative removal therefrom of hexachlorosiloxane.

What is claimed is:

1. A method of removing hexachlorosiloxane from a mixture with titanium tetrachloride which comprises the steps of treating said mixture with a fluorinating agent capable of converting the mixture to a mixture of titanium tetrachloride and lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride.

2. A method of removing hexachlorosiloxane from a mixture with titanium tetrachloride which comprises the steps of fluorinating said hexachlorosiloxane by reaction with an alkali metal bifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride.

3. A method according to claim 2 wherein the alkali metal bifluoride is potassium bifluoride.

4. A method of removing hexachlorosiloxane from a mixture with titanium tetrachloride which comprises the steps of fluorinating said hexachlorosiloxane by reaction with titanium tetrafluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride.

5. A method of removing hexachlorosiloxane from a mixture with titanium tetrachloride which comprises the steps of fluorinating said hexachlorosiloxane by reaction with bromine trifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride.

6. A method of removing hexachlorosiloxane from a mixture with titanium tetrachloride which comprises the steps of treating said mixture with a fluorinating agent capable of converting the mixture to a mixture of titanium tetrachloride and lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride by methods of separation wherein boiling point differences are utilized as a basis for said separation.

7. A method of removing hexachlorosiloxane from a mixture with titanium tetrachloride which comprises the steps of fluorinating said hexachlorosiloxane by reaction with an alkali metal bifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride by methods of separation wherein boiling point differences are utilized as a basis for said separation.

8. A method according to claim 7 wherein the alkali metal bifluoride is potassium bifluoride.

9. A method of removing hexachlorosiloxane from a mixture with titanium tetrachloride which comprises the steps of fluorinating said hexachlorosiloxane by reaction with titanium tetrafluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride by methods of separation wherein boiling point differences are utilized as a basis for said separation.

10. A method of removing hexachlorosiloxane from a mixture with titanium tetrachloride which comprises the steps of fluorinating said hexachlorosiloxane by reaction with bromine trifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride by methods of separation wherein boiling point differences are utilized as a basis for said separation.

11. A method of removing hexachlorosiloxane from a mixture with titanium tetrachloride which comprises the steps of treating said mixture with a fluorinating agent capable of converting the mixture to a mixture of titanium tetrachloride and lower boiling fluoro-derivatives of the type $Si_2OF_xCl_{6-x}$, wherein $x$ is an integer from 1 to 6, and drawing off the said lower boiling fluoro-derivatives so formed from said mixture with titanium tetrachloride by fractional distillation.

12. A method of removing hexachlorosiloxane from a mixture with titanium tetrachloride which comprises the steps of fluorinating said hexachlorosiloxane by reaction with an alkali metal bifluoride, yielding lower boiling fluoro-derivatives of the type $Si_2OF_xCl_{6-x}$, wherein $x$ is an integer from 1 to 6, and drawing off the said lower boiling fluoro-derivatives so formed from said mixture with titanium tetrachloride by fractional distillation.

13. A method according to claim 12 wherein the alkali metal bifluoride is potassium bifluoride.

14. A method of removing hexachlorosiloxane from a mixture with titanium tetrachloride which comprises the steps of fluorinating said hexachlorosiloxane by reaction with titanium tetrafluoride, yielding lower boiling fluoro-derivatives of the type $Si_2OF_xCl_{6-x}$, wherein $x$ is an integer from 1 to 6, and drawing off the said lower boiling fluoro-derivatives so formed from said mixture with titanium tetrachloride by fractional distillation.

15. A method of removing hexachlorosiloxane from a mixture with titanium tetrachloride which comprises the steps of fluorinating said hexachlorosiloxane by reaction with bromine trifluoride, yielding lower boiling fluoro-derivatives of the type $Si_2OF_xCl_{6-x}$, wherein $x$ is an integer from 1 to 6, and drawing off the said lower boiling fluoro-derivatives so formed from said mixture with titanium tetrachloride by fractional distillation.

16. A method of removing hexachlorosiloxane from a mixture with titanium tetrachloride which comprises the steps of fluorinating said hexachlorosiloxane by reaction with a fluorinating agent selected from the group of inorganic fluorine-containing compounds consisting of alkali metal bifluorides, titanium tetrafluoride, and bromine trifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride by methods of separation wherein boiling point differences are utilized as a basis for said separation.

17. A method of removing hexachlorosiloxane from a mixture with titanium tetrachloride which comprises the steps of fluorinating said hexachlorosiloxane by reaction with a fluorinating agent selected from the group of inorganic fluorine-containing compounds consisting of alkali metal bifluorides, titanium tetrafluoride, and bromine trifluoride, yielding lower boiling fluoro-derivatives of the type $Si_2OF_xCl_{6-x}$, wherein $x$ is an integer from 1 to 6, and drawing off the said lower boiling fluoro-derivatives so formed from said mixture with titanium tetrachloride by fractional distillation.

18. A method of removing hexachlorosiloxane from a mixture with titanium tetrachloride which comprises the steps of fluorinating said hexachlorosiloxane by reaction with at least one fluorinating agent selected from the group consisting of alkali metal bifluorides, titanium tetrafluoride and bromine trifluoride, yielding lower boiling fluoro-derivatives of the type $Si_2OF_xCl_{6-x}$, wherein $x$ is an integer from 1 to 6, and separating the said lower boiling fluoro-derivatives so formed from said mixture with titanium tetrachloride.

References Cited in the file of this patent

UNITED STATES PATENTS

| 1,984,480 | Henne | Dec. 18, 1934 |
| 2,598,898 | Espenschied | June 3, 1952 |
| 2,722,510 | Schaefer | Nov. 1, 1955 |

OTHER REFERENCES

Booth et al.: "Fluorination of Chlorodisiloxane," article in J.A.C.S., vol. 67, pages 1092–95 (July 1945).